United States Patent [19]

Okanoue

[11] Patent Number: 5,623,482
[45] Date of Patent: Apr. 22, 1997

[54] INTERLOCKING APPARATUS

[75] Inventor: Yasuyo Okanoue, Tokyo, Japan

[73] Assignee: NEC Corporation, Japan

[21] Appl. No.: 411,536

[22] Filed: Mar. 28, 1995

[51] Int. Cl.[6] .................. H04J 3/14; G06F 11/16
[52] U.S. Cl. ...................... 370/224; 395/182.02
[58] Field of Search .................. 370/16.1, 16, 15,
370/85.12, 85.15; 395/182.02

[56] References Cited

U.S. PATENT DOCUMENTS

| | | | |
|---|---|---|---|
| 5,406,549 | 4/1995 | Kremer | 370/16.1 |
| 5,440,540 | 8/1995 | Kremer | 370/16.1 |
| 5,446,725 | 8/1995 | Ishiwatari | 370/16.1 |

OTHER PUBLICATIONS

H. Sakauchi, "*A Self-Healing Network With An Economical Spare-Channel Assignment*", IEEE Global Telecommunications Conference, Dec. 2–5, 1990.

A Fast Distributed Restoration Technique For Networks Using Digital Cross Connect Machines; Author: W.D. Grover; Globecomm '87, pp. 1090–1095.

Failure Immunization Technology For Network Service Survivability (Fitness); Authors: C. Han Yang and Satoshi Hasegawa; pp. 1549–1554.

Sonet Line Protection Switched Ring APS Protocol; Authors: J. Baroni, W. Kremer, P.N. Lamy, W.C. Marra, M.J. Soulliere; Feb. 6, 1991.

Synchronous Optical Network (Sonet): Automatic Protection Switching; American National Standard For Telecommunications; Exchange Carriers Standards Association.

Sonet Bidirectional Line Switched Ring Equipment Generic Criteria; Bell Communications Research; Technical Advisory TA–NWT–001230, Issue 2, Apr. 1992.

*Primary Examiner*—Douglas W. Olms
*Assistant Examiner*—Min Jung
*Attorney, Agent, or Firm*—Ostrolenk, Faber, Gerb & Soffen, LLP

[57] ABSTRACT

An interlocking apparatus capable of expanding a network while effectively using survivability of a self-healing ring, including a ring network connecting a plurality of nodes having a loop back function and a supplementary node connected to the first and second nodes of the ring netwrok. In the first node, a service selector selects a normal signal from the two signals sent from the second node and the supplementary node to output the selected signal to a next stage node. In the supplementary node, a path selector selects a normal signal from the two signals sent from the first and second nodes to output the selected signal outside the ring network. The service selector and the path selector include a monitor controller for always selecting the normal signal from the two input signals and further judge and determine a trigger for executing a switching or a switching direction in an autonomous distributed manner.

5 Claims, 7 Drawing Sheets

5,623,482

INTERLOCKING APPARATUS

BACKGROUND OF THE INVENTION

The present invention relates to an interlocking apparatus for restoring a link failure and an equipment failure in an interlocking network communication using a bidirectional line switched self-healing ring coupling a plurality of nodes.

DESCRIPTION OF THE RELATED ARTS

In a conventional failure restoration technique of link and equipment failures of this kind, a mesh self-healing technique and a self-healing ring technique as an autonomous distributed failure restoration technique are known.

The mesh self-healing technique is described, for example, in "The Selfhealing Network: A Fast Distributed Restoration Technique for Networks Using Digital Cross-Connect Machines", W. D. Grover, IEEE Proceedings of Globecom '87, pp. 28-2-1-28-2-6, November 1987; "Fitness: Failure Immunization Technology for Network Service Survivability", H. C. Yang and S. Hasegawa, IEEE Proceedings of Globecom '88, pp. 47-3-1–47-3-6, December 1988; and "A Self-Healing Network with an Economical Spare-Channel Assignment", H. Sakauchi, Y. Nishimura and S. Hasegawa, IEEE Proceedings of Globecom '90, pp. 403-1-1–403-1-6. December 1990. In this technique, the mechanism does not depend on the configuration of the network.

On the other hand, the self-healing ring technique is a system to be applied to a ring network, and the failure restoration is performed by switching the path to a predetermined spare ring or spare network. This self-healing ring technique is classified into a bidirectional line switched self-healing ring (B-LSR) and a unidirectional path switched self-healing ring (U-PSR) according to the mechanism.

These systems based on a single ring are described in "SONET Line Protection Switched Ring APS Protocol", J. Baroni et al., T1X1. 5/91-026, February 1991; "Synchronous Optical Network (SONET): Automatic Protection Switching", T1X1, 5/92-004R6. 1992; "Synchronous Optical Network (SONET) Transport Systems: Common Generic Criteria", TR-TSY-000496 (Issue 2), September 1991; and "SONET Bidirectional Line Switched Ring Equipment Generic Criteria", TR-TA-NWT-001230 (Issue 2), April 1992 and the standardization is carried on.

The conventional self-healing ring system can provide a quick restoration compared with the mesh self-healing system. However, in the self-healing ring system, the restoration time largely depends on the size of the ring network and particularly in the B-LSR, the number of the nodes within the ring is restricted. As a result, the self-healing ring system is limitedly applied to small scale networks.

SUMMARY OF THE INVENTION

Accordingly, it is an object of the present invention to provide an interlocking apparatus, free from the aforementioned problems of the prior art, which is capable of expanding a network while using survivability ability of a self-healing ring effectively.

In accordance with one aspect of the present invention, there is provided an interlocking apparatus, comprising a ring network connecting a plurality of nodes including first and second nodes, each node-having loop back means; and a supplementary node connected to the first and second nodes, the first node including first sending means for sending out a signal to be sent to the second node to the second node and to the supplementary node; and first selection means for selecting a normal signal from signals sent from the second node and the supplementary node to output the selected signal to a next stage node, the second node including second sending means for sending out the signal sent from the first node to the supplementary node; and third sending means for sending out a signal sent from the supplementary node to the first node, the supplementary node including fourth sending means for sending out a signal sent to the supplementary node from outside the ring network to the first and second nodes; and second selection means for selecting a normal signal from signals sent from the first and second nodes to output the selected signal outside the ring network.

Preferably, the first and second selection means include waiting means for carrying out a waiting from a detection of a failed signal of the two input signals to an execution of a switching from the failed signal to the normal signal when the normal signal is selected from the two input signals in the selecting operation. The first and second selection means can include monitor control means for always selecting the normal signal from the two input signals.

In a preferred interlocking apparatus, the first node further includes fifth sending means for sending out the signal sent from the first sending means of the first node to the supplementary node; and sixth sending means for sending out the signal sent from the fourth sending means of the supplementary node to the first selection means of the first node.

The supplementary node can be connected to the first and second nodes via first and second links, respectively.

The ring network is preferably a bidirectional line switched self-healing ring.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
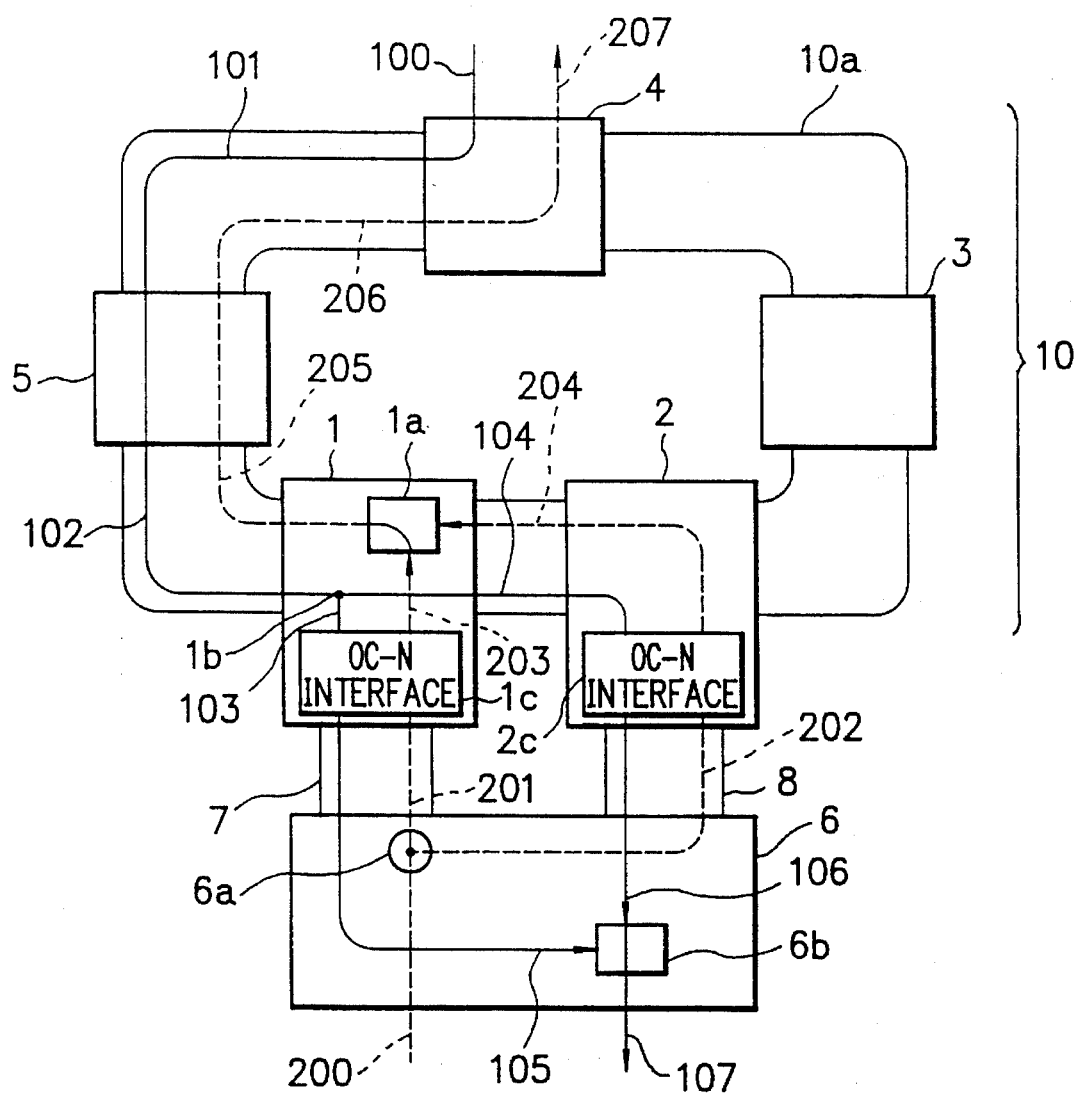
FIG. 1 is a block diagram of one embodiment of an interlocking apparatus according to the present invention.

Referring now to the drawings, wherein like reference characters designate like or corresponding parts throughout the views and thus the repeated description thereof can be omitted for brevity, there is shown in FIG. 1 one embodiment of an interlocking apparatus according to the present invention.

As shown in FIG. 1, in the interlocking apparatus, a ring network (hereinafter referred to as BLSR) 10 is composed of five nodes 1 to 5 individually include a loop back means. In this embodiment, a supplementary node 6 is also coupled with the BLSR 10. That is, the supplementary node 6 is connected to two OC-N interface parts 1c and 2c of the nodes 1 and 2 in the BLSR 10 via two OC-N (optical carrier level-N (N=1, 3, 9, 12, 18, 24, 36, 48)) links 7 and 8, respectively.

Now, relating to the path between the node 4 and the supplementary node 6 as both the end nodes, the node 4 inputs a signal 103 and outputs the input signal 100 as a signal 101 to the node 5 via the ring 10a, and the node 5 outputs the received signal 101 as a signal 102 to the node 1 via the ring 10a. In the node 1, the signal 102 fed from the node 5 is input to a drop & continue part 1b from where the signal 102 is distributed toward the node 2 and the supplementary node 6.

The node 2 receives a signal 104 from the drop & continue part 1b of the node 1 and passes on the signal to the supplementary node 6 via the OC-N interface part 2c and the OC-N link 8. On the other hand, the node 1 passes on a signal 108 distributed in the drop & continue part 1b to the supplementary node 6 via the OC-N interface part 1c and the OC-N link 7.

In the supplementary node 6, when signals 105 and 106 are fed from the OC-N interface parts 1c and 2c of the nodes 1 and 2, a path selector 6b selects one of these signals 105 and 106 to output the selected one as a signal 107 outside the BLSR 10. In the normal operation, although the path selector 6b can select any direction, in this embodiment, the path selector 6b selects the signal 106 sent from the OC-N interface part 2c and connects it to a lower speed part.

Next, a signal 200 is input from the outside to the supplementary node 6 and is distributed toward the nodes 1 and 2 in a bridge part 6a. That is, signals 201 and 202 distributed in the bridge part 6a are output to the nodes 1 and 2 via the OC-N links 7 and 8, respectively.

The node 2 receives the signal 202 distributed in the bridge part 6a of the supplementary node 6 via the OC-N interface part 2c and passes on the signal 202 as a signal 204 to the node 1.

In the node 1, when the signals 203 and 204 are input to a service selector 1a from the OC-N interface parts 1c and 2c of the nodes 1 and 2, the service selector 1a selects one of these signals 203 and 204 and outputs the selected one as a signal 205 to the node 5. Then, the node 5 outputs the signal 205 sent from the node 1 as a signal 206 to the terminal node 4. The node 4 outputs the received signal 206 as a signal 207 out of the BLSR 10. In the normal operation, although the service selector 1a can select any direction, in this embodiment, the service selector 1a selects the signal 203 sent from the OC-N interface part 1c and sends out the signal toward the terminal node 4.

In the BLSR 10, a self-healing mechanism is mounted in order to execute an autonomous distributed failure restoration processing when a failure occurs within the ring 10a. Further, the service selector 1a and the path selector 6b each include a monitor control means for always selecting the normal signal from the two input signals and each further judge and determine a trigger for executing a switching or a switching directin in an autonomous distributed manner.

When a failure occurs outside the BLSR 10, for example, in the OC-N line 7 or 8, the failure can be restored by switching the signals by means of the service selector 1a and the path selector 6b.

In the processing for executing the switching in the service selector 1a and the path selector 6b a waiting (protection) processing is provided at least from the detection of the failure in the input signal to the execution of the switching. This waiting processing is conducted in order to avoid an occurrence of a useless switching.

Figure 2:
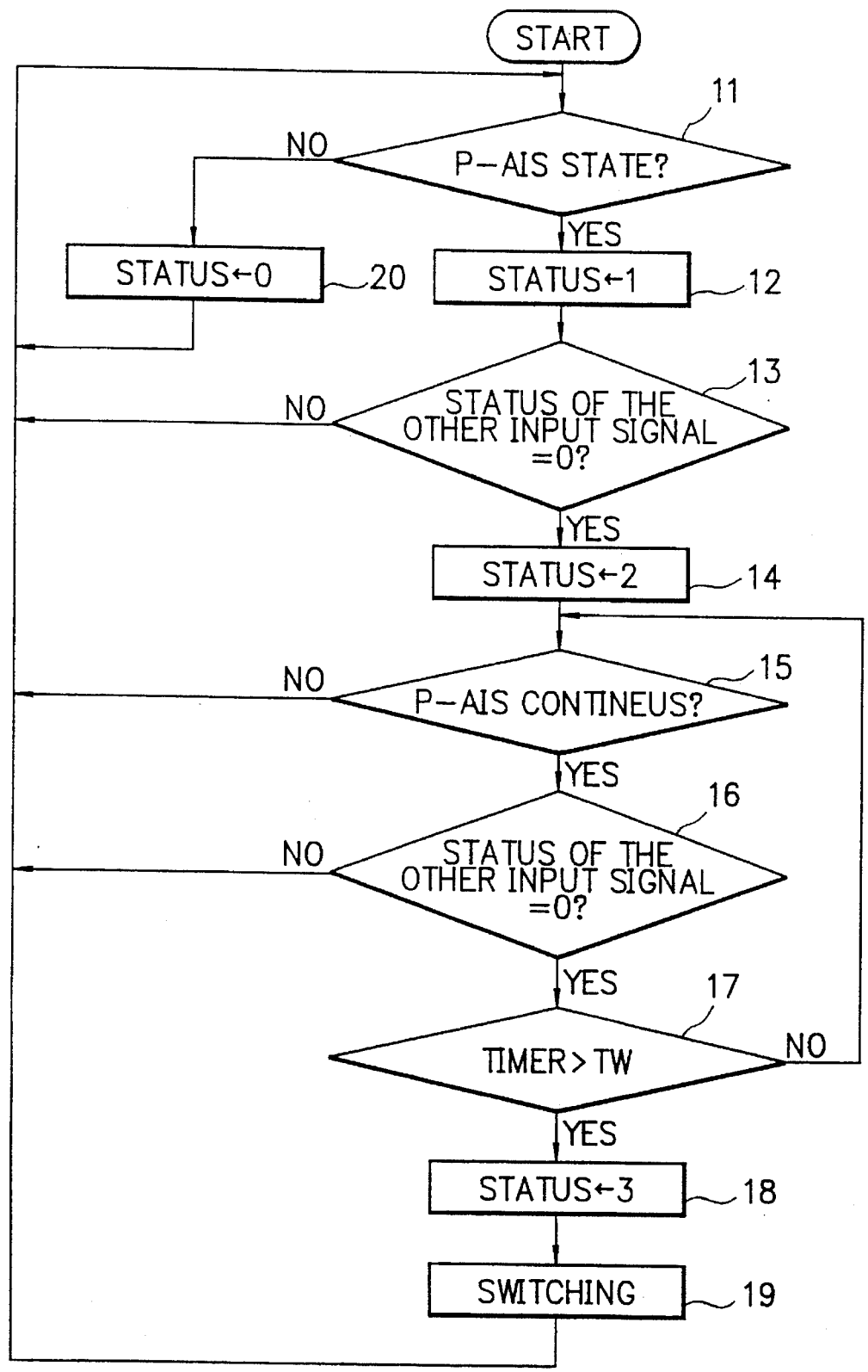
FIG. 2 is a flowchart showing an operation of a service selector and a path selector shown in FIG. 1.

FIG. 2 is a flowchart showing the operation of the service selector 1a and the path selector 6b shown in FIG. 1. The operation of the service selector 1a and the path selector 6b will now be described in connection with FIG. 1 and FIG. 2.

First, in FIG. 2, CPUs (not shown) of the nodes 1 and 6 including the service selector 1a and the path selector 6b check whether or not any failure occurs in the signals input to the service selector 1a and the path selector 6b, that is, whether or not the service selector 1a and the path selector 6b are a P-AIS (path alarm indication signal) state in step 11.

In this embodiment, the checking of the P-AIS state or not is carried out by confirming the presence or absence of the line cut by means of the presence or absence of the input of a LOS (loss of signal) signal, a LOF (loss of frame) signal or an L-AIS (line alaram indication signal) signal when a state that the input signal is all 0 continues for 100 μs or more. In this case, in place of the checking of the P-AIS state or not, a checking of failures in the circuits constituting the network or on the paths between the circuits can be conducted.

When the CPUs of the nodes 1 and 6 are not the P-AIS state, status=0 is given in step 20 and the operation returns to step 11 for checking the P-AIS state again. On the other hand, when the CPUs of the nodes 1 and 6 are the P-AIS state, status=1 is given in step 12, and the status of the other input signal is checked whether or not to be 0 in step 13.

When the status of the other input signal is not 0, the CPUs of the nodes 1 and 6 return the process to the step 11. In turn, when the status of the other input signal is 0, status=2 is given in step 14, and the operation moves to a waiting phase. At this time, the CPUs of the nodes 1 and 6 start a timer (not shown) in order to measure an elapsed time in the waiting phase.

In this waiting phase, the CPUs of the nodes 1 and 6 check whether or not the above P-AIS state continues in step 15. When the P-AIS state does not continue, the operation returns to step 11. On the other hand, when the P-AIS state continues, the CPUs of the nodes 1 and 6 check whether or not the status of the other input signal is 0 in step 16.

When the status of the other input signal is not 0, the operation returns to step 11. When the status of the other input signal is 0, the CPUs of the nodes 1 and 6 check whether or not the value of the timer is larger than a predetermined time tw in step 17. In this case, the time tw means the waiting time from the detection of the failure to the execution of the switching.

When the value of the timer is not lareger than the time tw, the operation returns to step 15 for checking the P-AIS state continuation. On the other hand, when the value of the time is larger than the time tw, the CPUs of the nodes 1 and 6 give status=3 in step 18 and move to a switching processing of the service selector 1a and the path selector 6b in step 19.

That is, in step 19, the CPUs of the nodes 1 and 6 output a select control signal for instructing the switching of the signals to the service selector 1a and the path selector 6b, and the service selector 1a and the path selector 6b switch from the selected signals to the other signals. Thereafter, the CPUs of the nodes 1 and 6 return the operation to step 11.

Figure 3:
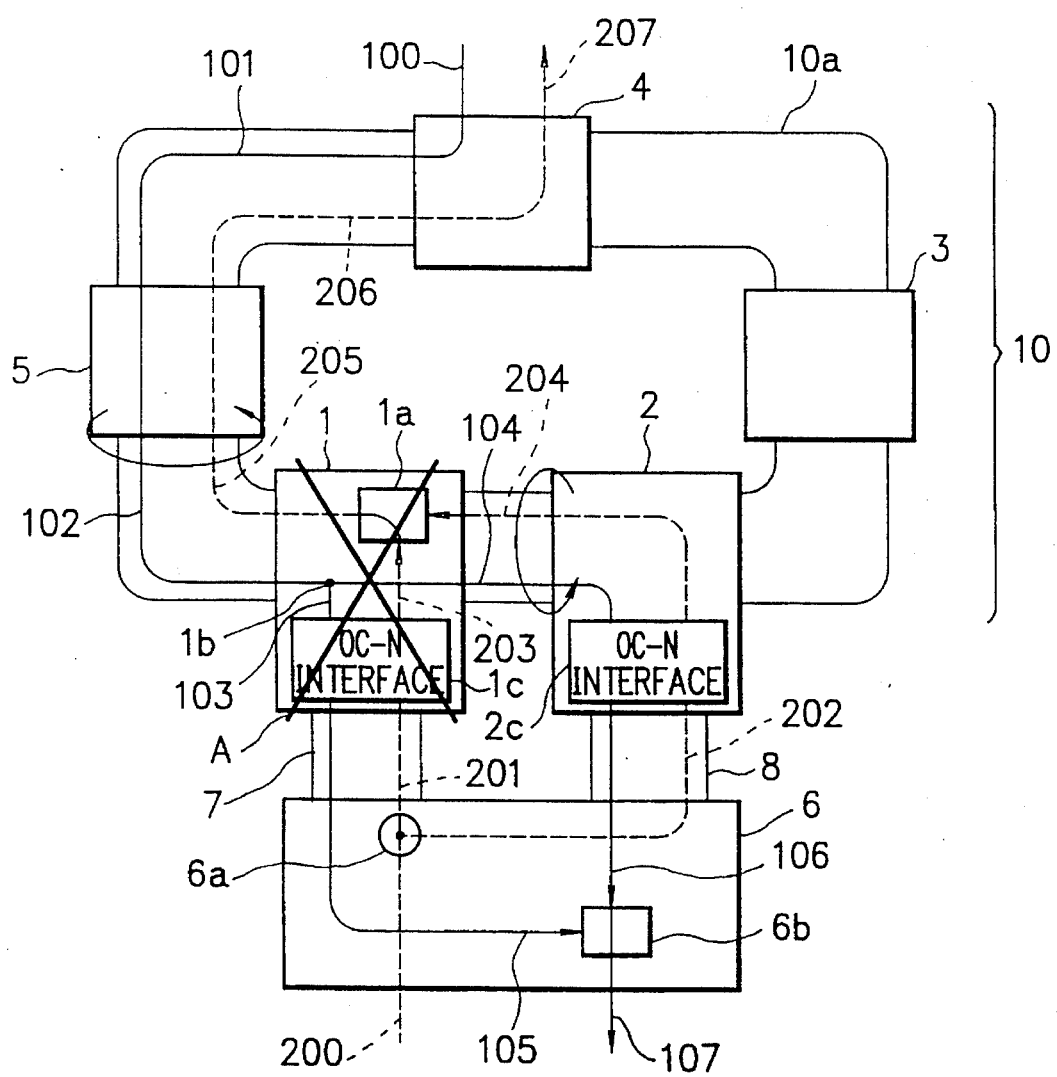
FIGS. 3 and 4 are block diagrams showing a failure restoration operation in the interlocking apparatus shown in FIG. 1 when a failure occurs in a node 1.
Figure 4:
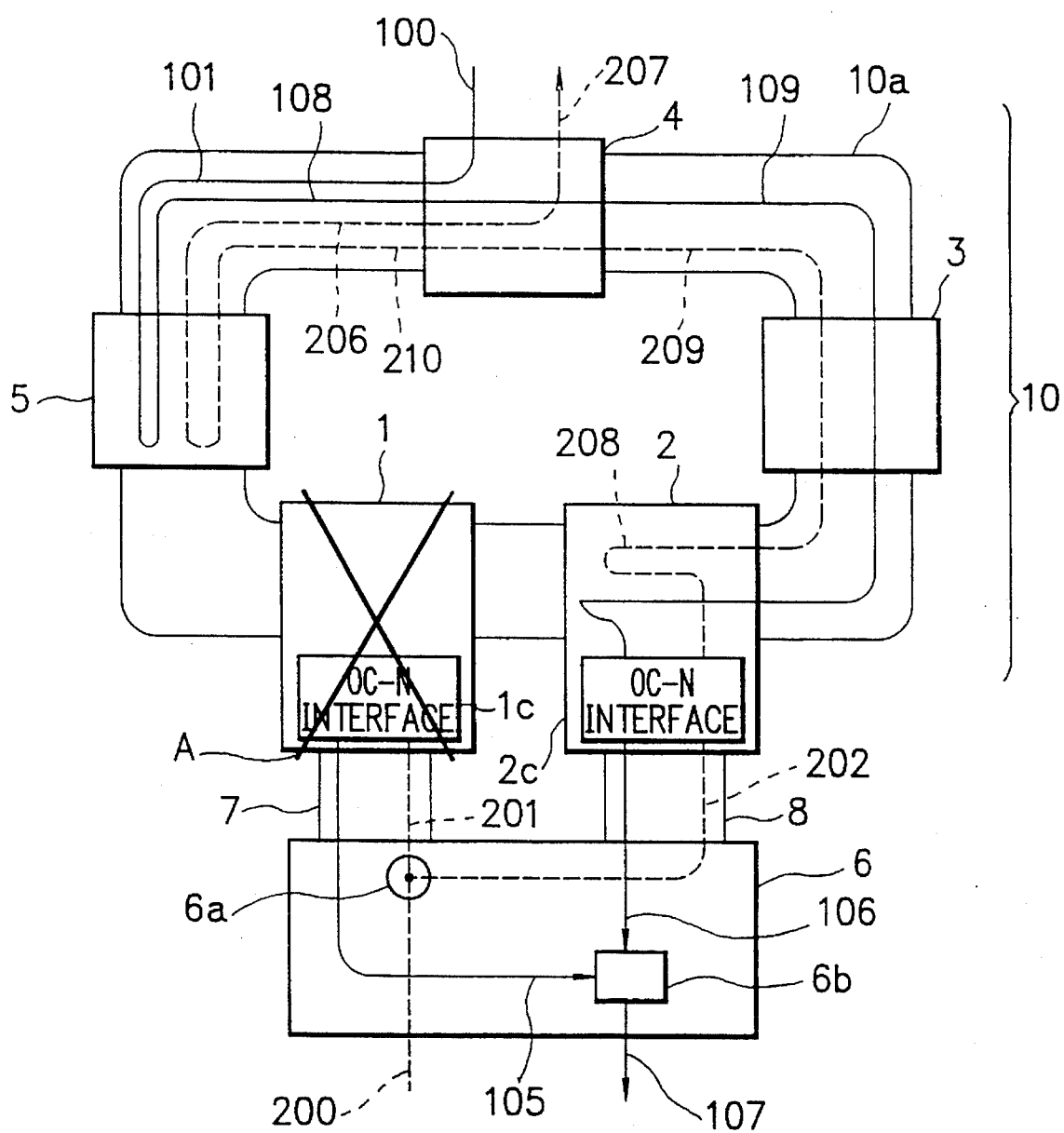

FIGS. 3 to 7 illustrate failure restoration operations in the foregoing interlocking apparatus. That is, FIGS. 3 and 4 show the failure restoration operation when a failure A occurs in the node 1, FIG. 5 the failure restoration operation when a failure B occurs in the node 2, FIG. 6 the failure restoration operation when a failure C occurs in the OC-N link 7 and FIG. 7 the failure restoration operatin when a failure D occurs in the OC-N link 8.

First, when the failure A occurs in the node 1, as shown in FIG. 3, by the function of the bidirectional line switched self-healing ring 10a, the loop back processings are executed in the nodes 2 and 5. By the loop back processings, the lines 100 and 207 are taken a roundabout route using a protection ring (spare bands) allocated for the spares. That is, in FIG. 4, the signal 100 fed to the node 4 is output as the signal 101 to the node 5, and the signal 101 is loop-backed in the node 5 to output a signal 108 to the node 4.

The node 4 outputs the received signal 108 as a signal 109 to the node 3, and the node 3 outputs the signal 109 as a signal 110 to the node 2. When receiving the signal 110 from the node 3, the node 2 passes on the signal 110 to the supplementary node 6 via the OC-N interface part 2c and the OC-N link 8.

Hence, in the supplementary node 6, the signals 105 and 106 are input to the path selector 6b from the OC-N interface parts 1c and 2c of the nodes 1 and 2. However, the signal 105 input from the OC-N interface part 1c is detected to be abnormal unitl the failure A is removed, and the path selector 6b selects the signal 106 input from the OC-N interface part 2c to output as the signal 107 outside the BLSR 10.

In this case, after the loop back processings (in the nodes 2 and 5) in the BLSR 10 are finished, the signal 106 fed from the OC-N interface part 2c is returned to the normal state. As a result, the line failure due to the failure A can be avoided.

On the other hand, the signal 200 input to the supplementary node 6 is distributed toward the nodes 1 and 2 in the bridge part 6a. That is, the signals 201 and 202 distributed in the bridge part 6a are output to the OC-N interface parts 1c and 2c of the nodes 1 and 2 via the OC-N links 7 and 8.

In this case, in FIG. 4, the loop back processing is executed in the node 2 because the failure A occurs in the node 1. Thus, when the node 2 receives the signal 202 distributed in the bridge part 6a of the supplementary node 6 via the OC-N link 8 and the OC-N interface part 2c, the node 2 passes on the signal 202 as a signal 208 to the node 3.

The node 3 outputs the received signal 208 as a signal 209 to the node 4, and the node 4 outputs the signal 209 as a signal 210 to the node 5. In the node 5, the loop back is carried out and the signal 210 is output as the signal 206 to the terminal node 4. The node 4 outputs the signal 206 as the signal 207 outside the BLSR 10.

Figure 5:
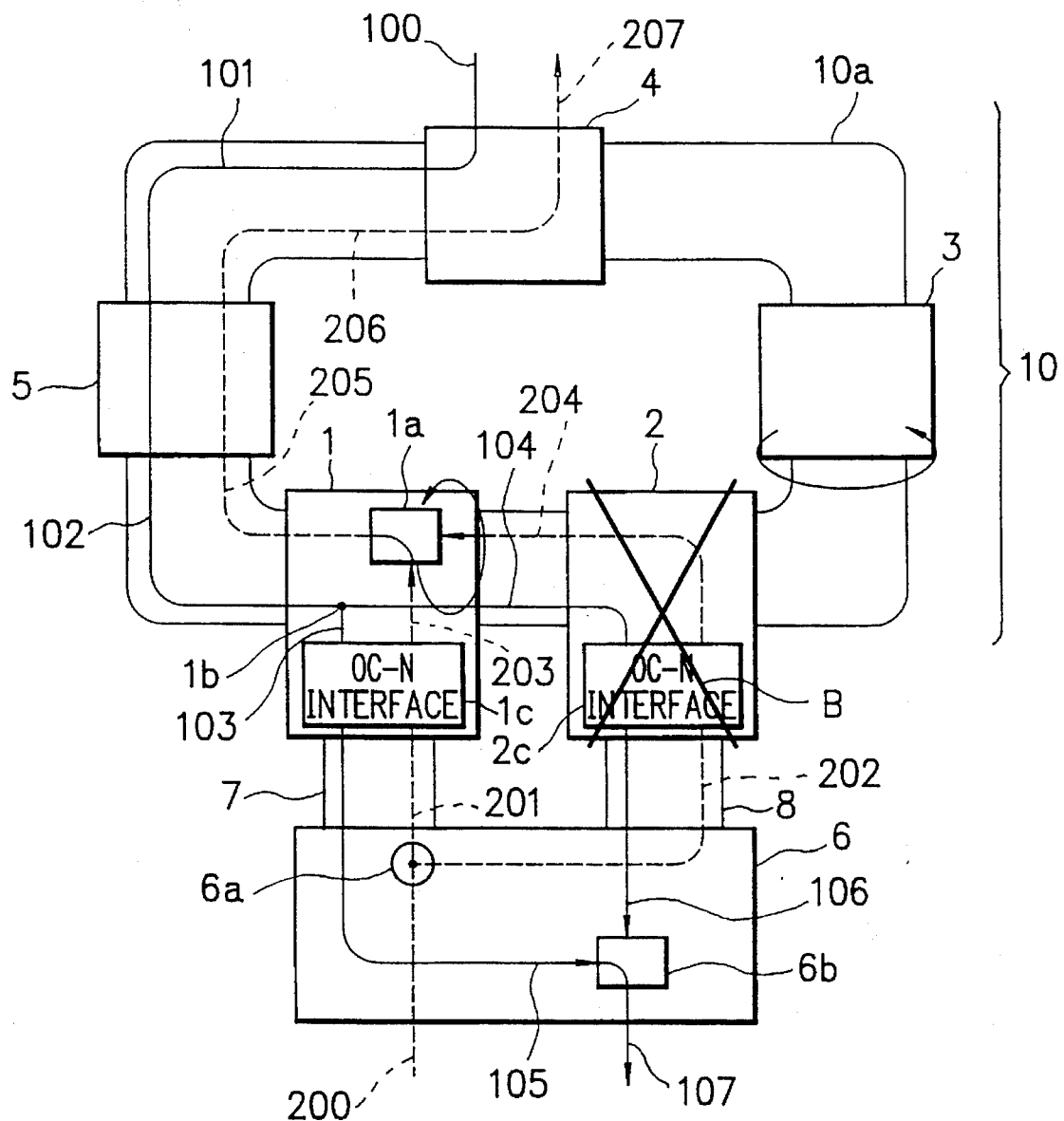
FIG. 5 is a block diagram showing a failure restoration operation in the interlocking apparatus shown in FIG. 1 when a failure occurs in a node 2.

Next, when the failure B occurs in the node 2, as shown in FIG. 5, the loop back processings are executed in the nodes 1 and 3 by the function of the bidirectional line switched self-healing ring 10a.

By the loop back processings, the lines 100 and 207 are made a detour using the protection ring allocated for the spares. That is, in FIG. 5, the signal 100 input to the node 4 is output as the signal 101 to the node 5, and the node 5 outputs the signal 101 as the signal 102 to the node 1.

In the node 1, when the signal 102 is input to the drop & continue part 1b from the node 5, the signal is distributed toward the nodes 2 and 6 in the drop & continue part 1b. The node 1 passes on the signal 103 distributed in the drop & continue part 1b to the supplementary node 6 via the OC-N interface part 1c and the OC-N link 7.

At this time, the failure B has occurred in the node 2 and thus the loop back processing is carried out in the node 1. Hence, although the signals 105 and 106 are input to the path selector 6b from the OC-N interface parts 1c and 2c of the nodes 1 and 2 in the supplementary node 6, the signal 106 fed from the OC-N interface part 2c cannot be restored, and thus the path selector 6b selects the normal signal 105 input from the OC-N interface part 1c and outputs this signal as the signal 107 outside the BLSR 10.

On the other hand, the signal input from the outside to the supplementary node 6 is distributed toward the nodes 1 and 2 in the bridge part 6a. That is, the signals 201 and 202 distributed in the bridge part 6a are output to the OC-N interface parts 1c and 2c of the nodes 1 and 2 via the OC-N links 7 and 8.

In this case, although the loop back processing is executed in the node 1 because the failure B has occurred in the node 2, the service selector 1a selects the signal 203 fed from the OC-N interface part 1c and outputs this signal as the signal 205 to the node 5. The node 5 outputs the received signal 205 as the signal 206 to the terminal node 4, and the node 4 outputs the signal 206 as the signal 207 outside the BLSR 10.

As described above, the failed signal 106 cannot be restored and thus the path selector 6b in the supplementary node 6 switches the signals so as to select the normal signal 105. As a result, the line failure can be avoided.

Figure 6:
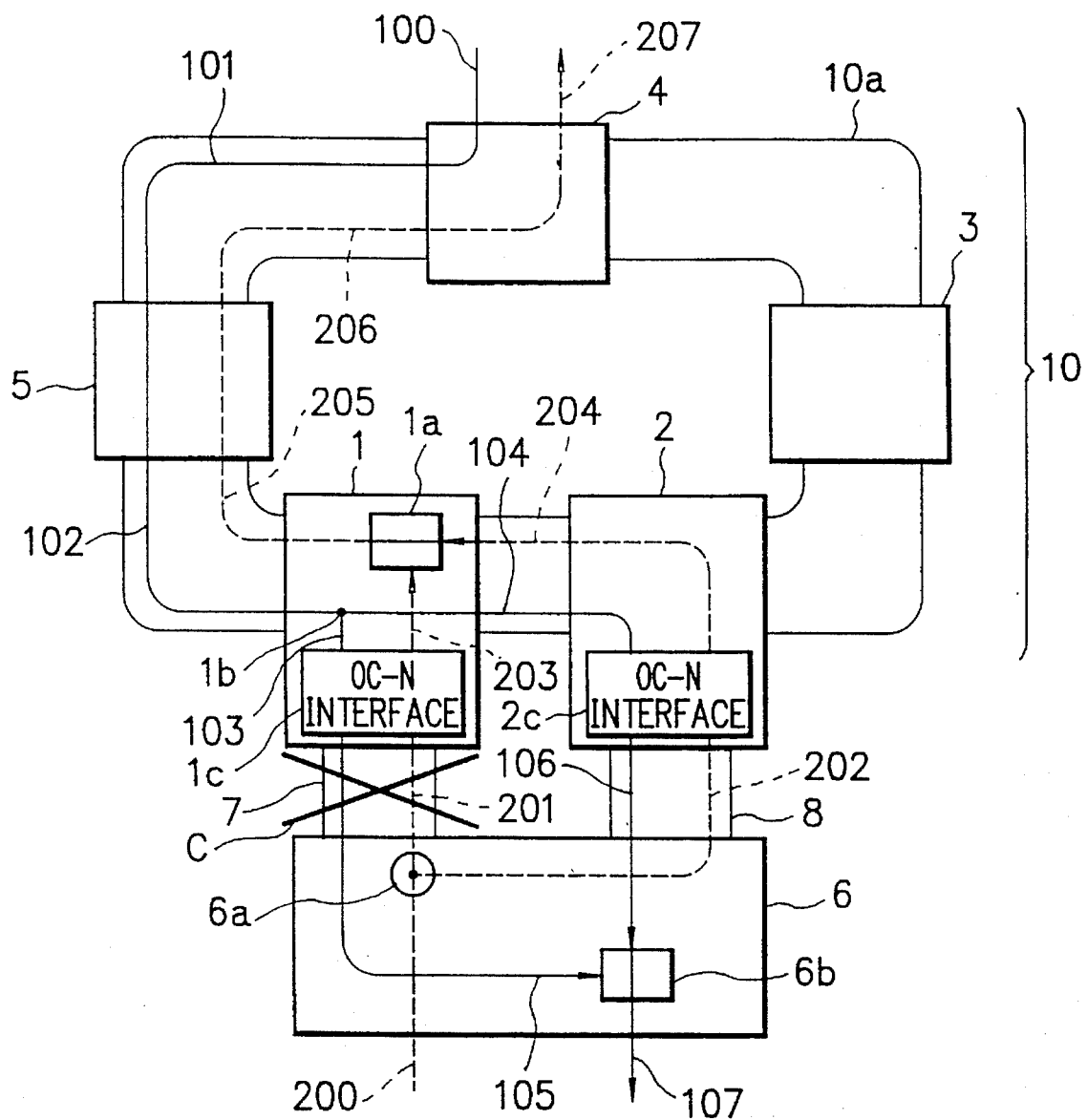
FIG. 6 is a block diagram showing a failure restoration operation in the interlocking apparatus shown in FIG. 1 when a failure occurs in one OC-N link 7.

Then, when the failure C occurs in the OC-N link 7, as shown in FIG. 6, although the selected signal 203 input from the OC-N interface part 1c becomes abnormal in the service selector 1a, the service selector 1a selects the normal signal 204 fed from the OC-N interface part 2c of the node 2. As a result, the line failure can be avoided.

In this case, in the path selector 6b of the supplementary node 6, the signal 105 input from the OC-N interface part 1c of the node 1 becomes abnormal due to the failure C in the OC-N link 7. However, the selected signal 106 input from the OC-N interface part 2c is still normal in the path selector 6b and hence cannot receive any influence by the failure C in the OC-N link 7.

Figure 7:
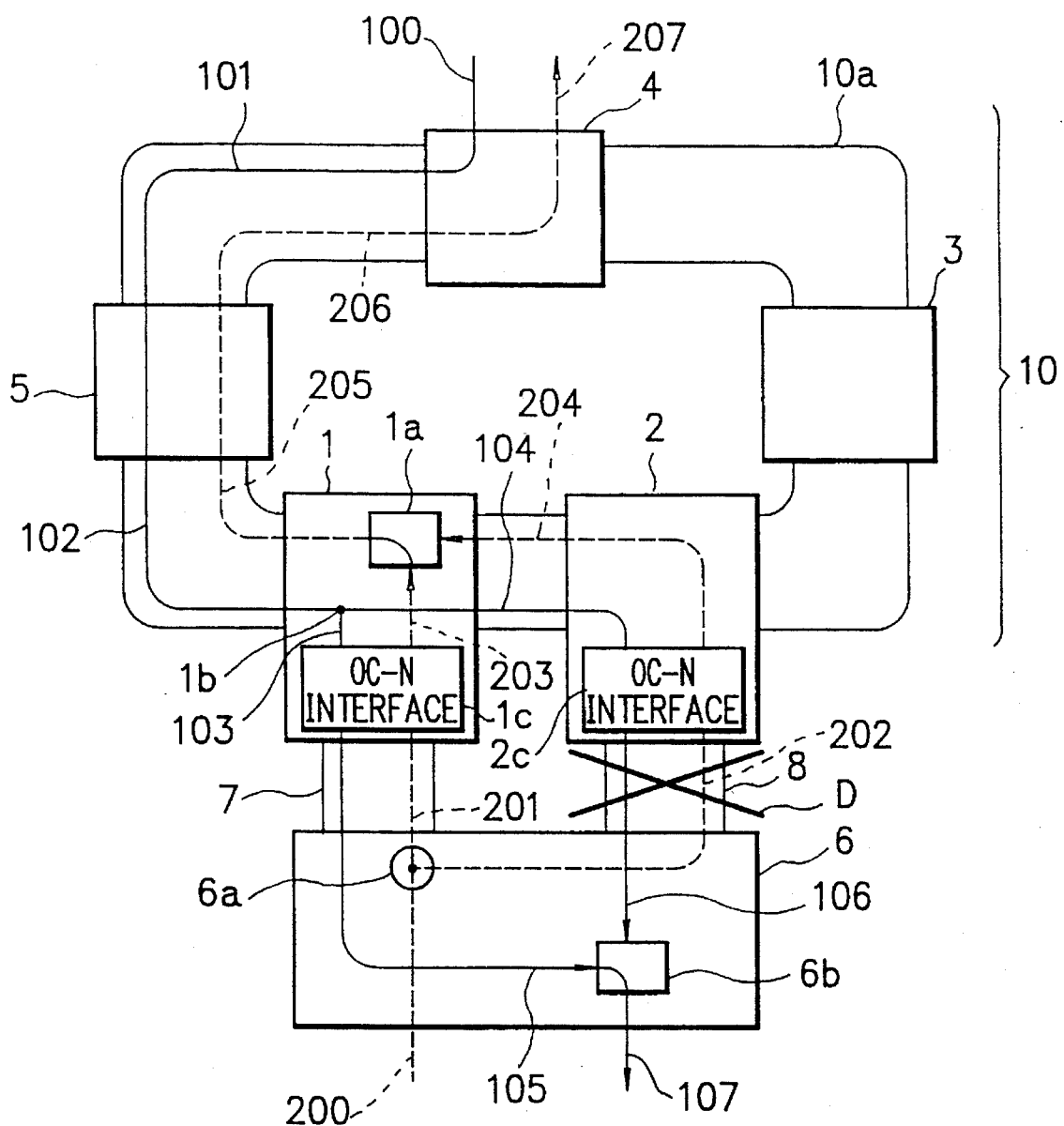
FIG. 7 is a block diagram showing a failure restoration operation in the interlocking apparatus shown in FIG. 1 when a failure occurs in OC-N link 8.

Next, when the failure D occurs in the OC-N link 8, as shown in FIG. 7, although the selected signal 106 input from the OC-N interface part 2c becomes abnormal in the path selector 6b of the supplementary node 6, the path selector 6b selects the normal signal 105 fed from the OC-N interface part 1c of the node 1. As a result, the line failure can be avoided.

In this case, in the service selector 1a of the node 1, the signal 204 input from the OC-N interface part 2c of the node 2 becomes abnormal by the failure D in the OC-N link 8. However, the selected signal 203 input from the OC-N interface part 1c is still normal in the service selector 1a and hence cannot be affected by the failure D in the OC-N link 8.

In this embodiment described above, as shown in FIGS. 3 to 7, it is readily understood that the line failure can be restored by the autonomous distributed switching in the service selector 1a of the node 1 or the path selector 6b of the supplementary node 6 without considering any failure within the BLSR 10 or outside the BLSR 10.

As described above, according to the present invention, by applying a route diversity mechanism to parts interlocked to a ring network, the whole network can be made to a self-healing system, that is, while survivability ability of a self-healing ring is used effectively, the network can be expanded.

Although the present invention has been described in its preferred embodiments with reference to the accompanying drawings, it readily understood that the present invention is not restricted to the preferred embodiments and that various changes and modifications can be made by those skilled in the art without departing from the spirit and scope of the present invention.

What is claimed is:

1. An interlocking apparatus, comprising:

a ring network connecting a plurality of nodes including first and second nodes, each node having loop back means; and a supplementary node connected to the first and second nodes, the first node including:

first sending means for sending out a signal to be sent to the second node and to the supplementary node; and first selection means for selecting a normal signal from signals sent from the second node and the supplementary node to output the selected signal to a next stage node, the second node including:

second sending means for sending out the signal sent from the first node to the supplementary node; and third sending means for sending out a signal sent from the supplementary node to the first node, the supplementary node including:

fourth sending means for sending out a signal sent to the supplementary node from outside the ring network to the first and second nodes; and second selection means for selecting a normal signal from signals sent from the first and second nodes to output the selected signal outside the ring network.

2. The interlocking apparatus as claimed in claim 1, wherein the first and second selection means include waiting means for carrying out a selection change after a detection of a failed signal of the two input signals to an execution of a switching from the failed signal to the normal signal when the normal signal is selected from the two input signals in the selecting operation.

3. The interlocking apparatus as claimed in claim 1, wherein the supplementary node is connected to the first and second nodes via first and-second links, respectively.

4. The interlocking apparatus as claimed in claim 1, wherein the ring network is a bidirectional line switched self-healing ring.

5. The interlocking apparatus as claimed in claim 1, wherein the first and second selection means includes monitor control means for always selecting the normal signal from the two input signals.

* * * * *